United States Patent [19]

Rutkiewic et al.

[11] Patent Number: 4,681,815

[45] Date of Patent: Jul. 21, 1987

[54] COATING COMPOSITION OF POLYESTER OLIGOMER AND ACRYLIC BINDER

[75] Inventors: Andrew F. Rutkiewic, West Chester; Clifford H. Strolle, Springfield, both of Pa.

[73] Assignee: E. I. Du Pont de Nemours and Company, Wilmington, Del.

[21] Appl. No.: 852,706

[22] Filed: Apr. 16, 1986

[51] Int. Cl.[4] .................... B32B 15/08; C08L 61/00
[52] U.S. Cl. .................................. 428/458; 524/512; 524/513; 524/902; 525/161; 525/162; 525/163; 525/166; 427/407.1; 427/410; 428/460; 428/463; 428/480; 428/483

[58] Field of Search ............... 525/162, 163, 161, 166, 525/173; 524/512, 513; 428/458, 460, 463, 480, 483

[56] References Cited

U.S. PATENT DOCUMENTS 4,591,533  5/1986  Antonelli et al. .................. 428/520

Primary Examiner—Theodore E. Pertilla

[57] ABSTRACT

A coating composition based on a binder comprising a major portion of acrylic resin and a minor portion of polyester oligomer, suitable for application to metal and non-metal substrates.

11 Claims, No Drawings

COATING COMPOSITION OF POLYESTER OLIGOMER AND ACRYLIC BINDER

BACKGROUND OF THE INVENTION

Acrylic coating compositions are widely used for finishing automobiles and trucks. With the development of 2-layer finishing systems in which a clear, unpigmented topcoat is applied over a colored basecoat, acrylic compositions have been used for both topcoat and basecoat.

With the incorporation of both polymeric and elastomeric parts as exterior body components, a need has arisen for finishes which can be applied to these surfaces as well as to metal. In addition to basic adhesion requirements, the curing characteristics and durability are important considerations in a coating that can be successfully applied to both metal and non-metal automotive finishes. It is widely recognized that a hard finish, when applied to a non-metal surface, will not only tend to crack itself, but will actually depreciate the strength of the substrate onto which it is coated. In addition, a coating which is to be simultaneously applied to metal and non-metal surfaces must be able to withstand the curing conditions that are applicable to both. For example, when an automobile is exposed to an elevated temperature for a given period of time, a metal substrate will conduct heat to the coating on that substrate more quickly than a non-metallic substrate. Thus, the same coating applied to metal and non-metal parts is exposed to elevated curing temperatures for different periods of time, depending on the substrate to which it is applied.

SUMMARY OF THE INVENTION

The instant invention provides a coating composition that is suitable for application to both metal and non-metal surfaces, and which provides excellent durability and wear characteristics on either surface.

Specifically, the instant invention provides a coating composition comprising at least about 60% of a film-forming binder consisting essentially of (a) about from 15 to 30% by weight of a polyester oligomer having a molecular weight of about from 3500 to 5000 and prepared from:
  (1) at least one compound selected from the group consisting of aliphatic triols having from 2 to 6 carbon atoms,
  (2) at least one compound selected from the group consisting of aliphatic and aromatic diols having from 2 to 14 carbon atoms, and
  (3) at least one compound selected from the group consisting of aliphatic dibasic acids having from 8 to 14 carbon atoms,
components (1), (2) and (3) being present in quantities to provide about from 3 to 9 moles of each of components (2) and (3) for each mole of component (1), and (b) about from 85 to 70% of a blend of an acrylic polymer, a self-stabilized, dispersed acrylic polymer and an alkylated melamine formaldehyde crosslinking agent.

DETAILED DESCRIPTION OF THE INVENTION

The present coating compositions are based on a binder prepared from a polyester polyol and an acrylic component. The polyester polyol is present in a concentration of about from 15 to 30% by weight. Less than about 15% of the polyester polyol will generally result in a final coating composition which exhibits inadequate flexibility for use on polymeric and elastomeric substrates. More than about 30 weight percent of this component will depreciate the long-term durability of the coating.

The polyester oligomer is formed from three components, these being a triol, a glycol and an aliphatic dibasic acid of 9 to 14 carbon atoms.

The first component of the polyester oligomer, the triol, generates a heavily branched structure which, in turn, permits the preparation of an extensively cross-linked structure. The triol generally has from 2 to 6 carbon atoms. Representative triols which can be used for this component include glycerine, trimethylol ethane, trimethylol propane 1,2,6-hexane triol and the monoester of pentaerthythritol, of which trimethylol propane has been found to be particularly satisfactory.

The diol component of the polyester oligomer can be selected from a wide variety of difunctional glycols or acids. They can be aliphatic or aromatic and generally have 2 to 14 carbons. They can be substituted with or interrupted with noninterfering groups such as O, S, halogen and the like. Such diols include, for example, ethylene glycol, propylene-1,2-glycol, propylene-1,3-glycol, butylene-1,3-diol, butylene-1,4-diol, butylene-2,3 diol, neopentylglycol, i.e., 2,2-dimethylpropane-1,3-diol, 2,2-diethylpropane-1,3-diol, 2-methyl-2-propyl-propane-1,3-diol, decamethylene glycol, dodecamethylene glycol, thioethylene glycol, monoethyl ether of glycerine, and allyl ethers of glycerol. Polycaprolactone diol, the reaction product of caprolactone and ethylene glycol, can also be used. Preferably the diols will have from 2 to 8 carbon atoms and most preferably from 2 to 6 carbon atoms. Of these, neopentyl glycol has been found to be particularly satisfactory.

The third component of the polyester oligomer, the aliphatic dibasic acid, is present to give flexibility to the system. The relatively long chain aliphatic acid, having from 8 to 14 carbon atoms, with its lack of branching, exhibits a high degree of mobility in the polymer system, increasing the flexibility of the final polyester oligomer. Representative dibasic acids which can be used in the present invention include, for example, suberic, azeleic, sebacic, dodecanoic and undecanoic acids. Azeleic acid in the polyester oligomer has been found to provide a final coating composition with greater toughness than dodecanedioic acid, and is accordingly preferred.

The polyester oligomer can be prepared by combining the indicated three components in a molar ratio of about from 3 to 9 moles of each of the diol and dibasic acid to each mole of the triol. The components are reacted in the presence of a small amount of organic solvent, such as aromatic hydrocarbons, aliphatic hydrocarbons and ketones. Such solvents can include, for example, xylene, mesitylene, cumene, aliphatic hydrocarbons having a boiling point of about from 90 degrees to 190 degrees C., methylisobutyl ketone, methyl amyl ketone and the like. The three components react without a catalyst, which provides additional benefits for the long-term durability of coatings prepared from this oligomer.

The resulting molecular weight of the polyester oligomer, for satisfactory performance in coating compositions prepared according to the present invention, should range from about 3500 to about 5000. Polyester oligomers having a molecular weight of about from 4000 to 4500 are preferred, and those having a molecular weight of about from 4200 to 4400 have been found to be particularly satisfactory.

Molecular weight, as used herein, refers to weight average molecular weight as measured by gel permeation chromatography using polymethyl methacrylate as a standard.

The acrylic component of the binder system, comprising, as a complement to the polyester polyol, about from 85 to 70% by weight of the binder, is a combination of acrylic polymer, a stabilized dispersion resin and an alkylated melamine formaldehyde crosslinking agent, all as described in the co-pending, coassigned application of Antonelli et al., U.S. Ser. No. 740,895, filed Jun. 3, 1985, which is hereby incorporated by reference and now issued as U.S. Pat. No. 4,591,533. Particular attention is directed to the description of the acrylic polymer appearing at column 1, line 57, to column 2, line 26, the description of the self-stabilized dispersed resin appearing at column 2, lines 27 to 68; and the description of the alkylated melamine formaldehyde cross-linking agent appearing at column 3, lines 20 to 28.

The acrylic polymer 1 as described in the Antonelli et al. application is generally present in a concentration of about from 15 to 30% of the binder; the self-stabilized dispersion is present in concentrations of about from 15 to 25% and the alkylated melamine formaldehyde crosslinking agent is present in a concentration of about from 30 to 45 weight percent.

After preparation of the basic components of the present binder system, these components are physically admixed. In general, about from 15 to 30 weight percent of the polyester oligomer is used.

Coatings prepared according to the present invention are characterized by an unusually low solvent content. In the final coating composition, typically the solvent content of the coating formulations, including both the oligomer and the acrylic component, is less than 40% and often lower than 35%. Solvents which can be used include organic solvents such as those described in the Antonelli et al. application.

The coating composition can be used with the binder components alone as a clear coating applicable to both metallic and flexible substrates. The coating composition, in addition to the binder components, can contain minor concentrations, for example, up to 5% by weight, of typical additives used for coating formulations, including one or more ultraviolet light stabilizers, particularly those described in the forementioned co-pending application of Antonelli et al.

The coating compositions can, if desired, contain up to about 50% pigment. Pigments which can be used in the present coating compositions include those described in the Antonelli et al. application previously incorporated by reference.

The coating compositons of the present invention can be applied to a substrate by conventional spraying techniques, and preferably electrostatic spraying. After application to the substrate, the coating is cured by exposure to elevated temperatures, for example, about from 225 to 275 degrees F. for a period of about from 15 to 60 minutes. In general, a coating having a final thickness of about from 1 to 5 mils, and preferably about from 1 to 2 mils, provides a cured finish having excellent gloss, adhesion and weatherability. A curing temperature of 250 degrees F. for a period of about 30 minutes has been found to be particularly satisfactory for curing coating compositions of the present invention.

The present invention is further illustrated by the following specific examples, in which parts and percentages are by weight unless otherwise indicated.

EXAMPLE 1

An aliphatic polyester oligomer was prepared in a reaction vessel equipped with a stirrer, a water separater, condenser and thermometer. Heating means were provided to control the temperature.

144 Parts of toluene, 402 parts of trimethylol propane, 968.8 parts of neopentyl glycol and 2070 parts of dodecanedioic acid were charged into the reaction vessel and heated to reflux. The water of esterification was collected in the separator and the reaction temperature was maintained at 148–245 degrees C.

The resulting polymer was evaluated for molecular weight and found to exhibit a molecular weight of 4124, 4271, 4303 and 4582 for separate batches prepared according to the above procedure.

24.6 parts of the polyester oligomer were combined with 20.2 parts of acrylic resin, 16.6 parts of stabilized dispersion and 38.6 parts of alkylated melamine formaldehyde crosslinking agent prepared according to Example 1 of the Antonelli et al. application. In addition to the basic resin components, 2% of ultraviolet light stabilizer, commercially available from Ciba-Geigy Corporation as Tinnovin 900, was added to the coating composition.

The coating composition was sprayed onto steel and reinforced injected molded polymeric substrates and cured at 250 degrees F. for 30 minutes. Both surfaces exhibited excellent gloss, adhesion and abrasion-resistance.

We claim:

1. A coating composition comprising at least about 60% of a film-forming binder consisting essentially of
   (a) about from 15 to 30% by weight of a polyester oligomer having a weight average molecular weight of about from 3500 to 5000 and prepared from:
   (1) at least one compound selected from the group consisting of aliphatic triols having from 2 to 6 carbons atoms,
   (2) at least one compound selected from the group consisting of aliphatic and aromatic diols having from 2 to 14 carbon atoms, and
   (3) at least one compound selected from the group consisting of aliphatic dibasic acids hiving from 8 to 14 carbon atoms,
   components (1), (2) and (3) being present in quantities to provide about from 3 to 8 moles of each of components (2) and (3) for each mole of component (1), and
   (b) about from 85 to 70% of a blend of an acrylic polymer, a self-stabilized, dispersed acrylic polymer and an alkylated melamine formaldehyde crosslinking agent.

2. A coating composition of claim 1 wherein component (1) in the polyester oligomer is trimethylol propane.

3. A coating composition of claim 1 wherein the glycol is neopentyl glycol.

4. A coating composition of claim 1 wherein the aliphatic acid in the polyester oligomer is dodecanedioic acid.

5. A coating composition of claim 1 wherein the aliphatic acid in the polyester is azeleic acid.

6. A coating composition of claim 1 wherein the polyester oligomer has a molecular weight of about from 4000 to 4500.

7. A coating composition of claim 6 wherein the polyester oligomer has a molecular weight of about from 4200 to 4400.

8. A coating composition of claim 1 further comprising up to about 50% pigment.

9. A coating composition of claim 1 further comprising up to about 2% ultraviolet light stabilizer.

10. A substrate coated with a cured layer of the composition of claim 1.

11. A substrate coated with a layer of pigmented paint composition and having a layer in adherence thereto of the composition of claim 1.

* * * * *